Patented June 10, 1930

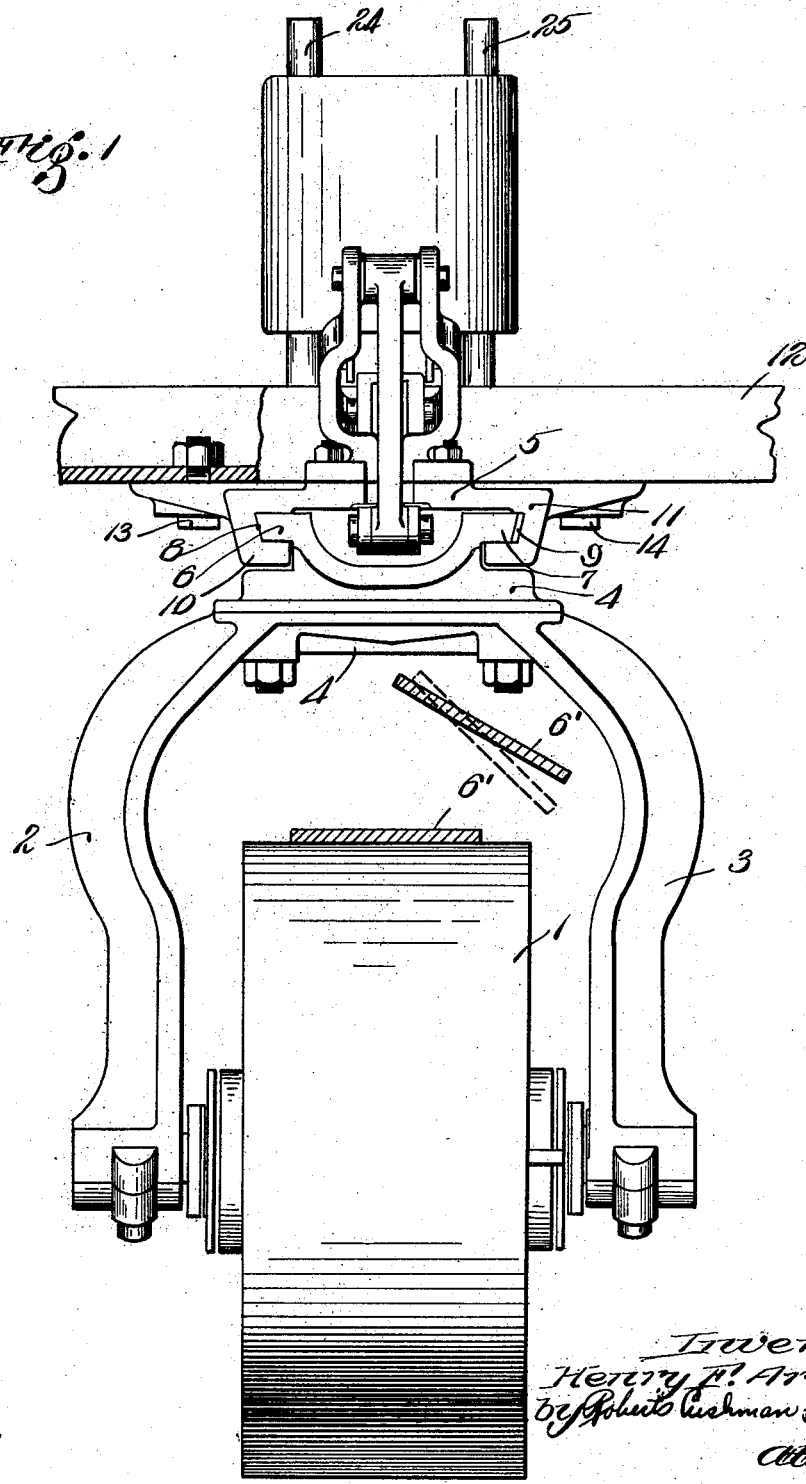

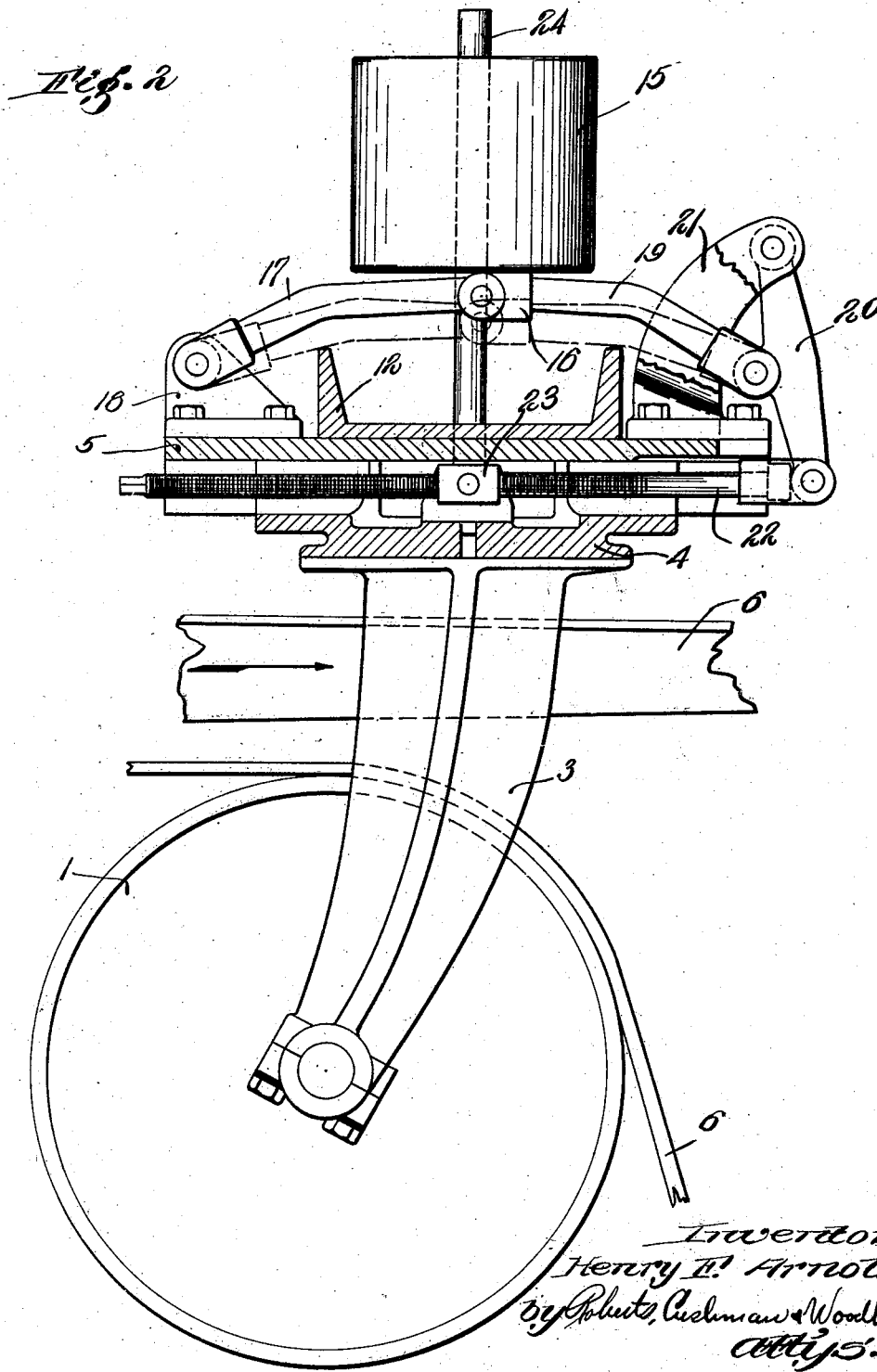

1,762,149

UNITED STATES PATENT OFFICE

HENRY F. ARNOLD, OF HYDE PARK, MASSACHUSETTS, ASSIGNOR TO AMERICAN TOOL & MACHINE COMPANY, OF BOSTON, MASSACHUSETTS, A CORPORATION OF MASSACHUSETTS

IDLER PULLEY

Application filed August 21, 1926. Serial No. 130,564.

The present invention relates to idler pulleys for belt tensioning and more particularly to a form of idler pulley particularly adapted automatically to tighten a belt while it is being driven and to maintain a predemined tension thereon.

In accordance with the present invention the tensioning force is so applied as gradually to increase in effective value as the pulley moves in response thereto, thus tightening the belt in a very certain and reliable manner, provision being made for manual adjustment of the pulley to determine the initial belt tension. The invention is herein disclosed as embodied in a construction in which the idler pulley is carried by a support moving in a substantially rectilinear path, although in its broader aspects the invention is not necessarily restricted to this arrangement.

In the accompanying drawings, a preferred embodiment of the invention is illustrated, in which:

Fig. 1 is a view in elevation of my invention, a part being broken away to show the mode of attaching the device to a beam or other supporting means; and Fig. 2 is a side elevation of the device, partly in section.

Referring more in detail to the drawings, the numeral 1 indicates a pulley or idler of the usual form which may be supported by arms 2 and 3, or other holding means. In order to render the pulley movable I preferably connect the arms 2 and 3 to a supporting member 4, which is so mounted in a holding member 5 as to be slidable or movable in a direction to tighten a belt.

In the drawings a belt 6' is shown passing between the arms 2 and 3 the upper section of which passes in the direction indicated by the arrow (Fig. 2) to the device to be driven, the lower section of the belt passing over the pulley 1 in the opposite direction, being then delivered to a belt-driving pulley or a driven pulley, for example. The belt may obviously be driven by means of any suitable source of power and may be composed of leather or other desired composition.

The pulley 1 is preferably mounted in such a way as to move in a rectilinear path in a horizontal plane, although the path of movement of the pulley may be changed, depending upon the direction of movement or inclination of the driven belt. The arms 2 and 3 may be connected to the member 4 if desired, by bolts or other fastening means, or may be integral therewith. The member 4 preferably comprises side members 6 and 7 adapted to slide in grooves 8 and 9 formed in side arms 10 and 11 of the member 5, which arms extend downwardly so as to envelope the side members 6 and 7. By the movement of the members 6 and 7, in the grooves 8 and 9, the path of movement of the member 4 and the pulley 1 connected thereto is determined.

The tensioning mechanism is preferably supported by suitably attaching the member 5 to a beam 12 or other suitable supporting means, the member being attached thereto by means of bolts and nuts 13 and 14 or other suitable fastening means.

In order to move the member 4 and the pulley attached thereto so as to cause a predetermined tension in the belt 6', I preferably provide a weight member 15 which may be of any suitable size depending upon the amount of force which is desired to be applied and so mount the weight in relation to the pulley member as to multiply the force applied thereby, as the pulley moves in a direction to increase the tension on the belt. In order to accomplish this result I preferably mount a toggle lever 16 in connection with the pulley so that as the weight is moved downwardly the toggle opens outwardly so as to exert the maximum force in the lowered position of the weight. One arm 17 of the toggle lever is preferably held at one end by means of stationary support 18, which may be bifurcated, and to which the arm may be pivotally connected in any suitable way. The other arm 19 of the toggle lever is pivotally connected to the arm 17 and to a movable lever 20 which is operatively connected to the pulley member. One end of the lever 20 is connected to a fixed stationary support 21, which is preferably bifurcated so as to hold the lever 20 between its arms, and is supported by the member 5 or other stationary support. The other end of the lever 20 is preferably connected to the pulley supporting member 4 by means of an adjustable connection, such as screw-threaded rod 22 adapted to be turned relatively to the lever 20. A nut or other threaded member 23 is connected to the member 4 and is mounted on the rod 22 whereby, when the rod 22 is turned relative to the nut, the latter is moved along the rod, and the position of the pulley may therefore be adjusted to attain any desired degree of tension in the belt within certain limits.

The weight member 15 is preferably mounted upon stationary guide members 24, 25 in such a manner as to be slidable thereon, the members 24, 25 being preferably fixed in position, being mounted on the stationary beam 12, or attached to the stationary member 5. The toggle lever is preferably provided with a stop member, or may be so mounted with respect to the beam 12 that as the weight 15 moves downwardly against the toggle joint, the toggle is not opened to its full open position but comes into contact with the beam 12 as indicated in dotted lines in Fig. 2, so that when this position is reached, should the tension in the belt increase for any reason, the toggle would be moved back toward the closing position; whereby the force exerted by the weight member through the toggle lever is diminished.

In the operation of the tensioning device the position of the pulley is first adjusted by turning the screw rod 22 so as to attain the desired set. The rod is preferably adjusted so that in the position in which the weight 15 has moved downwardly to where the toggle lever has moved against its stops, the force exerted by the pulley against the belt will be the maximum desired tension. As the belt stretches or if the tension exerted by the belt changes, the toggle lever 16 will move in a direction to compensate for the change. If the tension in the belt should decrease for example, the weight 15 would move downwardly forcing the toggle lever into a more open position whereby the end of the arm 19 in contact with the lever 20 would move to the right forcing the lower end thereof, which is in contact with the rod 22, to the right also, and the nut 23 attached to the rod 22 and to the pulley supporting member 4 would also be moved to the right whereby the pulley 1 would also move in the same direction thereby causing increased tension in the belt.

It is to be understood that the device which has been described constitutes the preferred form of the invention, and that various changes or modifications may be made therein without departing from the spirit or scope of the invention as defined in the claims.

I claim:

1. In a device of the kind described, a bodily movable pulley, a toggle lever including two links connected in a central joint and operatively connected to said pulley to provide movement thereof, and means for applying a force to said joint of the toggle lever whereby the said pulley will be moved with a force in accordance with the leverage in the position assumed by the toggle.

2. In an automatic belt tightener the combination of a pulley, movable means for supporting the pulley, means for moving the said supporting means and said pulley in a rectilinear path comprising a toggle lever one link of which is operatively connected to said supporting means and the other link of which is attached to a stationary support, means for applying a force to the connection between said links of said toggle lever so as to move said pulley in a direction to tighten a belt and means for adjusting the relative position of said pulley and supporting means with respect to said moving means.

3. In an automatic belt tightener the combination of a belt engaging idler-pulley, a slidable support therefor, a weight member, a toggle lever comprising a pair of links having a joint therebetween operatively connected to said slidable support, and means for applying the weight of said weight member to the joint of said toggle lever to move the pulley in a direction to maintain tension in a belt.

4. In an automatic belt tightener a pulley, a stationary member having a guideway thereon, a movable supporting means for said pulley adapted to move in said guideway, a weight member, a toggle lever operatively connected to said movable supporting means, and means for applying the weight to the joint of the toggle lever, whereby the toggle lever will apply an increasing force to said supporting means as the pulley is moved in a direction corresponding to the open position of the toggle lever.

5. In an automatic belt tightener, the combination of a pulley, a movable support for said pulley, a holding member for said support having a guideway therein adapted to permit sliding movement of said movable support, a toggle lever pivoted at one end to a stationary support and operatively connected at its other end to said movable support, means for relatively adjusting the position of said support with respect to said toggle lever, a weight member, guide means for said weight member adapted to apply the weight to substantially the joint of the toggle, and stop means for said toggle to prevent movement thereof to its full open position.

Signed by me at Boston, Massachusetts, this sixteenth day of August, 1926.

HENRY F. ARNOLD.